July 7, 1953 R. H. DIESEL 2,644,709
OUTSIDE AUXILIARY DOOR LOCK FOR AUTOMOBILES
Filed Dec. 11, 1947
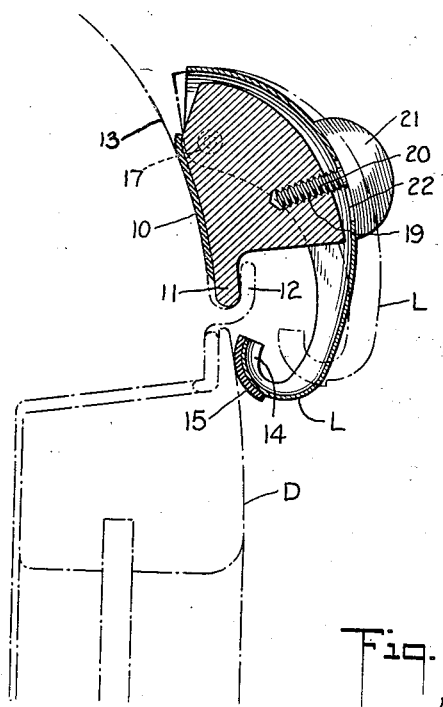
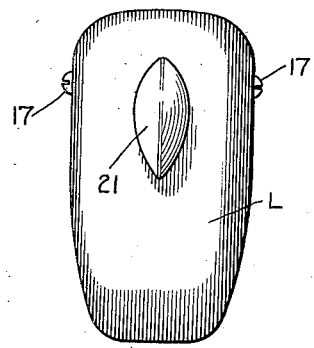
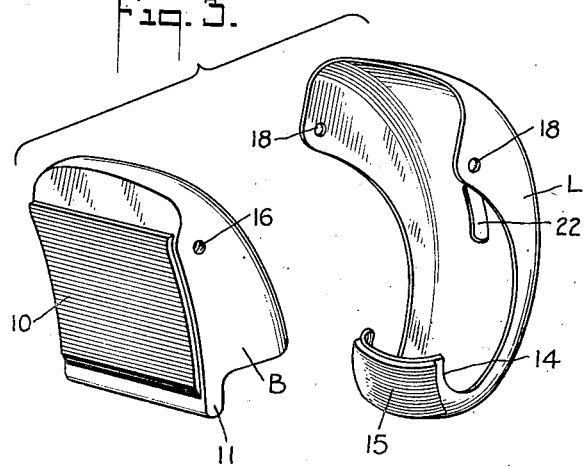
INVENTOR
R. H. Diesel
BY
ATTORNEY Patented July 7, 1953

2,644,709

UNITED STATES PATENT OFFICE 2,644,709

OUTSIDE AUXILIARY DOOR LOCK FOR AUTOMOBILES

Richard H. Diesel, Stamford, Conn., assignor to The Yale & Towne Manufacturing Company, Stamford, Conn., a corporation of Connecticut Application December 11, 1947, Serial No. 791,016

7 Claims. (Cl. 292—258)

This invention relates to an auxiliary lock for use on automobiles. More particularly, this invention relates to a lock of the class that may be applied to the outside of an automobile for locking a door thereof against opening from the inside, it being the purpose of the particular arrangement to prevent the accidental opening of an automobile door, as by children.

As a feature of my invention, I contribute a lock of the class described that may readily be placed in position for locking the door of an automobile, and may be readily removed when not required. As a feature of my invention, I so construct a part thereof that it may be applied to the rain groove of an automobile, with a door holding portion thereof against the door of the automobile. Thus, I make use of a part of the automobile for mounting my device, and therefore make it unnecessary to provide retaining means, mounting means, or to cut away and deform any part of the automobile.

As a further feature of my invention, I contribute a device of the class described in which the parts thereof are mutually self-retaining against the door of an automobile and within the rain groove of the automobile. As a still further feature of this part of the invention, adjusting means are utilized by me for adjusting the parts of my locking device relatively to one another for maintaining the parts thereof in position within the rain groove and against the door of the automobile.

I have thus outlined rather broadly the more important features of my invention in order that the detailed description thereof that follows may be better understood, and in order that my contribution to the art may be better appreciated. There are, of course, additional features of my invention that will be described hereinafter and which will form the subject of the claims appended hereto. Those skilled in the art will appreciate that the conception on which my disclosure is based may readily be utilized as a basis for the designing of other structures for carrying out the several purposes of my invention.

Referring now to the drawings, Fig. 1 is a vertical section through my locking device showing the automobile rain groove and door in dash and dotted lines, and with my locking device applied thereto. Fig. 2 is a front view of my invention, while Fig. 3 is an exploded perspective view of the two principal parts thereof.

Referring now more particularly to the drawings, and especially Fig. 3, my invention comprises a base portion B to one surface of which is preferably applied a rubber guard 10 as by a suitable adhesive. A depending part 11 of the base B is adapted to enter the usual rain groove 12 of an automobile as best seen in Fig. 1, and with the rubber guard 10 against the roof 13 of the automobile.

The locking part of my invention is designated by reference letter L in Fig. 3, and is preferably formed of wrought sheet metal with an inwardly bent locking portion 14 to which is applied a rubber guard 15 in the same way as the rubber guard 10 is applied to the base B. The part L is formed of sheet metal that is of rather thin section, and in this way the locking portion 14 is yielding relatively to the remainder of the part L. Base B is bored and threaded at 16 for suitable screws 17 that act as pivot shafts, the screws traversing bores 18 in the locking part L for mounting the said part for pivotal movement on the base B.

Base B is formed with a threaded bore 19 as best seen in Fig. 1, and within this threaded bore is a threaded shaft 20 formed integrally with a knob 21, it being understood that the threaded shaft 20 passes through a slot 22 in the locking part L. It is, of course, obvious that rotation of the knob 21 and the threaded shaft 20 will adjust the part L relatively to the base B as from its dash and dotted line position of Fig. 1 to its full line position of Fig. 1.

Thus, in utilizing my device, it is first applied with the portion 11 of the base B within the rain groove 12, and the part L in the dash and dotted line position of Fig. 1. Rotation of knob 21 forces the inwardly bent locking portion 14 against the door D of the automobile so as to hold that door yieldingly in its fully closed position. Of course, the part L will yield only a very small amount, it being understood that the yielding construction is mainly necessary in order to obtain an effective non-rattling assembly of the device to the automobile and door.

It will now be appreciated by those skilled in the art that my locking device may readily be applied and removed from an automobile, and that when assembled to the automobile, it will function effectively to maintain a door thereof in its closed position and against opening from the inside. Those understanding the problem faced by me and the prior art, will readily appreciate the value of my contribution herein disclosed.

I now claim:

1. In a lock of the class described, a base having a portion thereof shaped to fit and rest within the rain groove of an automobile, a door holding part, means mounting said door holding part for adjustment relatively to said base, means on said base shaped to engage a surface of said automobile outwardly of said groove for locating said base and said mounting means in a predetermined relationship to said automobile, and means for securing said base portion within the rain groove and said holding part against the door through adjustment of said part and said base relatively to one another when said mounting means is in said predetermined relationship to said automobile.

2. In a lock of the class described, a base having a portion thereof shaped to fit and rest within the rain groove of an automobile, a door holding part having a relatively yielding end surface, means mounting said door holding part for adjustment relatively to said base, means on said base shaped to engage a surface of said automobile outwardly of said groove for locating said base and said mounting means in a predetermined relationship to said automobile, and means for securing said base portion within the rain groove and said yielding end of said holding part against the door through adjustment of said part and said base relatively to one another when said mounting means is in said predetermined relationship to said automobile.

3. In a lock of the class described, a base having a portion thereof shaped to fit and rest within the rain groove of an automobile, a door holding part, means mounting said door holding part for adjustment relatively to said base, means for securing said base portion within the rain groove and said holding part against the door through adjustment of said part and base relatively to one another, said securing means serving to maintain said base part and door holding part in mutual retaining relation within said rain groove and against said door, and means on said base upwardly of said rain groove for engaging a surface of said automobile whereby to prevent tilting of said base by pressure of said door holding part against said door.

4. In a lock of the class described, a base having a portion thereof shaped to fit and rest within the rain groove of an automobile, a door holding part, means mounting said door holding part on said base for positioning against an automobile door offset from said base when said base portion is within said rain groove, means for adjusting said base and door holding portions relatively to one another into mutual retaining relation within said rain groove and against said door, and means on said base upwardly of said rain groove for engaging a surface of said automobile whereby to prevent tilting of said base by pressure of said door holding part against said door.

5. In a lock of the class described, a base having a portion thereof adapted to fit within the rain groove of an automobile, a door holding part, means pivotally mounting said door holding part on said base for application against an automobile door offset from said base when said base portion is within said rain groove, screw threaded adjusting means for adjusting said base and door holding portions relatively to one another into mutual retaining relation within said rain groove and against said door, and means on said base upwardly of said rain groove for engaging a surface of said automobile whereby to prevent tilting of said base by pressure of said door holding part against said door.

6. In a lock of the class described, a base having a portion thereof adapted to fit within the rain groove of an automobile, a door holding part, means pivotally mounting said door holding part on said base in a position extending downwardly below said base portion and toward the door when the base is in said rain groove, screw threaded adjusting means, a knob for actuating said adjusting means positioned for access on an outer surface of said door holding part, the rotation of said knob adjusting said base and door holding portions relatively to one another into mutual retaining relation within said rain groove and against said door, and means on said base upwardly of said rain groove for engaging a surface of said automobile whereby to prevent tilting of said base by pressure of said door holding part against said door.

7. In a lock of the class described, a base having a depending portion shaped to fit and rest within the rain groove of an automobile, means on said base for abutting a surface of said automobile above said rain groove, a door holding part movably attached to said base above said depending base portion and adapted to engage an automobile door below said rain groove, and means on said base for securing said door holding part against said door and said abutting means against said surface through adjustment of said part and said base relatively to one another, thereby securing said depending base portion in said rain groove.

RICHARD H. DIESEL.

References Cited in the file of this patent

UNITED STATES PATENTS

| Number | Name | Date |
| --- | --- | --- |
| 1,951,922 | Cantrell | Mar. 20, 1934 |